United States Patent
York et al.

[11] Patent Number: 5,848,461
[45] Date of Patent: Dec. 15, 1998

[54] ELECTRICAL MACHINE HAVING A ROTOR WITH AN IMPROVED ROTOR STOP

[75] Inventors: Michael Timothy York, Howell; Richard Kenneth Harris, Walled Lake, both of Mich.

[73] Assignee: Ford Motor Company, Dearborn, Mich.

[21] Appl. No.: 654,491

[22] Filed: May 28, 1996

[51] Int. Cl.$^6$ ................................................. H02K 15/02
[52] U.S. Cl. ................................. 29/598; 403/13; 310/42
[58] Field of Search ............................. 29/598; 310/263, 310/42, 107, 270, 271, 261; 403/281, 279, 274, 11, 13

[56] References Cited

U.S. PATENT DOCUMENTS

| | | |
|---|---|---|
| 3,206,623 | 9/1965 | Snowdon . |
| 3,849,682 | 11/1974 | Binns ........................................ 310/156 |
| 4,339,873 | 7/1982 | Kanamaru et al. ........................ 29/598 |
| 4,356,376 | 10/1982 | Komanduri et al. ............. 219/121 LN |
| 4,562,641 | 1/1986 | Mosher et al. ............................. 29/598 |
| 4,912,354 | 3/1990 | Frank ...................................... 310/271 |
| 5,065,651 | 11/1991 | Amey ....................................... 82/1.11 |
| 5,258,672 | 11/1993 | Wrobel ..................................... 310/42 |
| 5,291,812 | 3/1994 | Yen et al. ................................. 82/134 |
| 5,329,199 | 7/1994 | Yockey et al. .......................... 310/263 |
| 5,483,116 | 1/1996 | Kusase et al. .......................... 310/263 |
| 5,528,097 | 6/1996 | Gardner et al. ......................... 310/270 |
| 5,604,650 | 2/1997 | Chang et al. ............................ 360/107 |

*Primary Examiner*—Rinaldi I. Rada
*Assistant Examiner*—Kevin G. Vereene
*Attorney, Agent, or Firm*—Mark S. Sparschu

[57] ABSTRACT

In one embodiment of the present invention, an electrical machine includes a rotor having a rotor stop axially affixed with respect to a shaft of the rotor. The rotor stop has a surface which is machined after assembly of the rotor. The rotor is then assembled into the electrical machine, with the machined rotor stop surface accurately locating the rotor axially within the electrical machine. The rotor stop surface includes at least one groove to prevent the formation of long, continuous machining chips during the machining operation.

6 Claims, 2 Drawing Sheets

ELECTRICAL MACHINE HAVING A ROTOR WITH AN IMPROVED ROTOR STOP

BACKGROUND OF THE INVENTION

1. Field of the Invention

The present invention relates generally to electrical machines and more specifically to rotors for electrical machines.

2. Description of the Related Art

Rotors for electrical machines such as automotive alternators sometimes have a solid metal "rotor stop" axially affixed with respect to the shaft of the rotor. This rotor stop provides a surface which bears against another surface within the alternator to axially position the rotor within the alternator.

In many electrical machines, accurate axial positioning of the rotor within the machine is important. Only with accurate axial positioning of the rotor can the proper magnetic flux path between rotor and stator be realized. Therefore, after assembly of the rotor, the aforementioned surface of the rotor stop can be machined such that the surface provides an accurate datum surface for the subsequent assembly of the rotor into the electrical machine. Although such machining can provide the desired accurate datum surface, a problem can arise. Depending upon the material comprising the rotor stop and the previous manufacturing processes the rotor stop had undergone, long and continuous machining chips may be formed during the machining process. Such long chips may interfere with the machining process by tangling in the rotor or by binding up and breaking the machining tool being used. The result can be excessive scrap, downtime and cost in the machining operation.

Therefore, an improvement which will allow the machining of rotor stops for electric machine rotors without the shortcomings just described will provide advantages over the prior art.

SUMMARY OF THE INVENTION

The present invention provides a rotor for an electrical machine. The rotor comprises a shaft defining an axis of rotation of the rotor. The rotor also includes a rotor stop axially affixed with respect to the shaft, the rotor stop having a surface facing axially outwardly from the rotor. The surface includes at least one groove.

The present invention also provides a method for manufacturing a rotor for an electrical machine, the rotor having a shaft which defines an axis of rotation. The method includes the step of axially affixing a rotor stop with respect to the shaft, the rotor stop having a surface facing axially outwardly from said rotor and containing at least one groove which is radially-disposed with respect to the axis of rotation. The method also comprises the step of machining the surface of the rotor stop.

The present invention further provides a method for manufacturing electrical machine, the electrical machine including a rotor having a shaft which defines an axis of rotation of the rotor. The method comprises the step of axially affixing a rotor stop with respect to the shaft, the rotor stop having a surface facing axially outwardly from the rotor and containing at least one groove which is radially-disposed with respect to the axis of rotation. The method additionally includes the step of machining the surface of the rotor stop. Also, the method comprises the step of assembling the rotor within the electrical machine with the surface of the rotor stop axially locating the rotor.

A rotor for an electrical machine manufactured according to the present invention can have fewer concerns about long machining chips formed during machining of a rotor stop. The present invention can thus provide scrap, downtime and cost advantages over the prior art.

DETAILED DESCRIPTION OF THE PREFERRED EMBODIMENT

Figure 1:
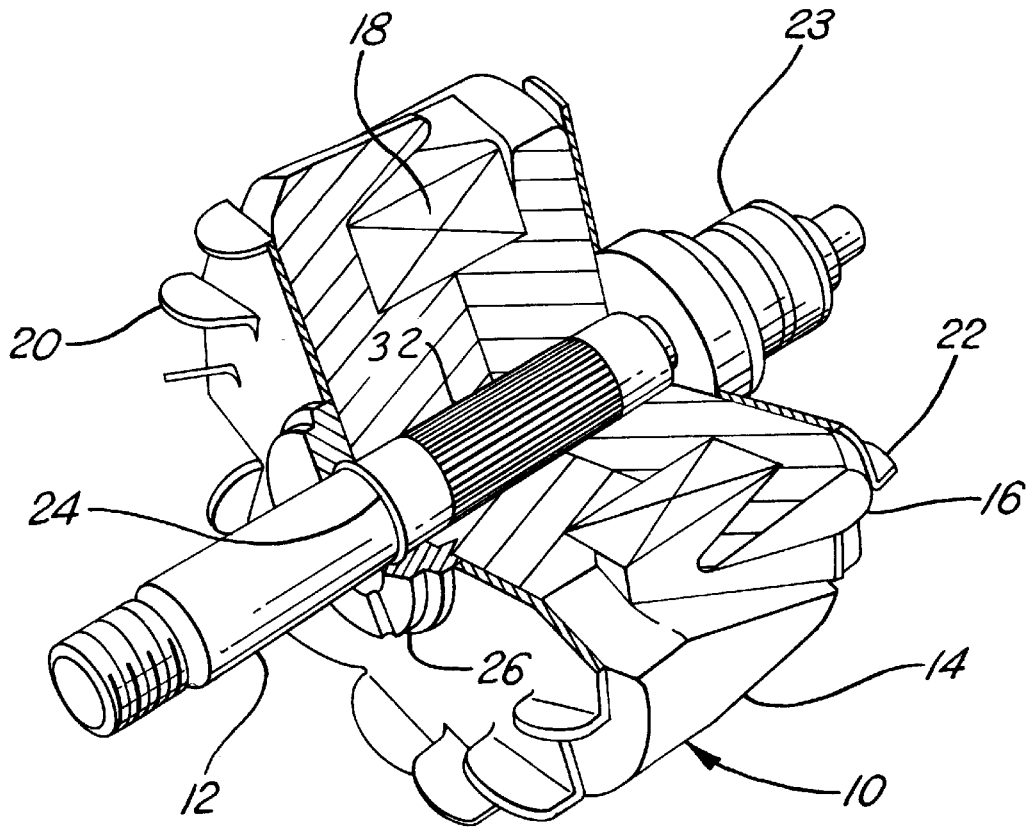
FIG. 1 is a perspective view of a partial cross section of a rotor 10 according to one embodiment of the present invention.

Referring first to FIG. 1, a rotor 10 for an automotive alternator is illustrated. Rotor 10 includes a shaft 12. Shaft 12 defines an axis of rotation of rotor 10. Disposed on shaft 12 for rotation therewith are two pole pieces 14 and 16. Positioned within the interleaved fingers of pole pieces 14 and 16 is a field coil 18. Affixed to the back of pole piece 14 is a first stamped metal fan 20, and affixed to the back of pole piece 16 is a second stamped metal fan 22. Fans 20 and 22 are affixed to their respective pole pieces 14 and 16 by projection welding or by an equivalently suitable method. A slip ring 23 is mounted on shaft 12 and serves as a well-known means to facilitate conduction of field current through field coil 18.

Located in a groove in shaft 12 is a snap ring 24. Being located in the groove in shaft 12, snap ring 24 is axially affixed with respect to shaft 12. Swaged over snap ring 24 is a rotor stop 26.

Figures 2A, 2B:
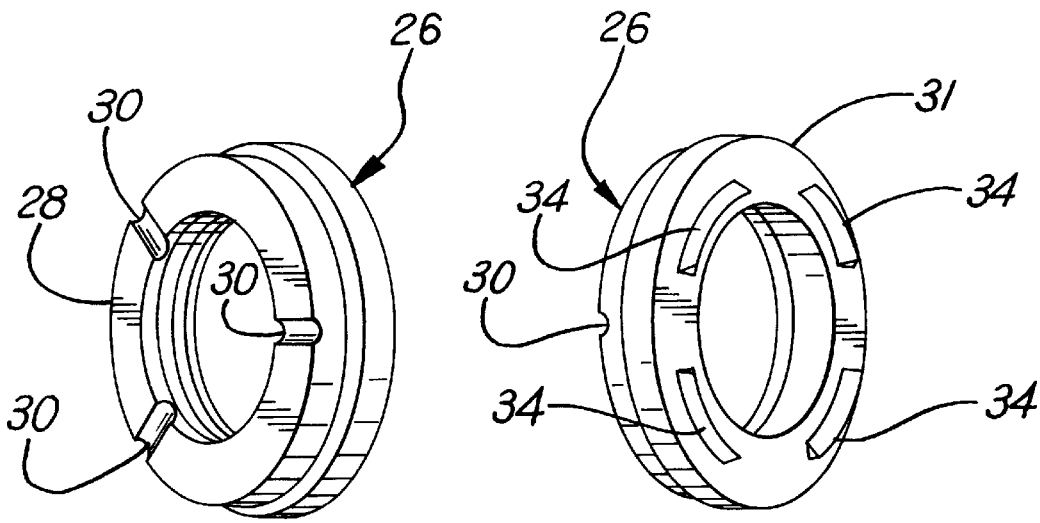
FIG. 2A is a perspective view of one surface of rotor stop 26 of FIG. 1.
FIG. 2B is a perspective view of a second surface of rotor stop 26 of FIG. 1.

Refer now additionally to FIGS. 2A and 2B. Rotor stop 26 includes a surface 28 into which are located three radial grooves 30. Grooves 30 are cold formed or are provided by an equivalently suitable manufacturing process. Rotor stop 26 also includes a surface 31 from which protrude integrally-formed projections 34. Projections 34 are preferably cold formed. Rotor stop 26 is preferably manufactured of low-carbon steel.

Rotor 10 is manufactured as follows. Pole pieces 14 and 16 are pressed onto knurled portion 32 of shaft 12, with field coil 18 disposed in between. Fans 20 and 22 are welded to their respective pole pieces 14 and 16. Snap ring 24 is inserted into its groove in shaft 12. Rotor stop 26 is then swaged over snap ring 24, with a tool providing counter-vailing force against the back of pole piece 14. In the swaging operation, rotor stop 26 becomes axially affixed with respect to shaft 12. Projections 34 of rotor stop 26 embed themselves into the back of pole piece 16 during the swaging operation. Slip ring 23 is then pressed onto shaft 12.

Surface 28 of rotor stop 26 serves as a "datum surface" of rotor 10. This datum surface is used to accurately position rotor 10 axially within the alternator. Thus, once rotor 10 is assembled by the process just described, surface 28 of rotor stop 26 is machined, preferably in a "facing" operation. That is, rotor 10 is rotated, and a tool is brought axially into contact with surface 28. The tool is then moved radially across surface 28 while rotor 10 is rotated. Grooves 30 on surface 28 prevent the formation of a long, continuous chip during the machining operation. As the tool crosses each groove 30, the chip being formed automatically breaks off. Thus, as rotor stop 26 of this embodiment of the present invention has three equally-spaced grooves 30, the machining chips break off each one-third revolution of rotor 10.

Figure 3:
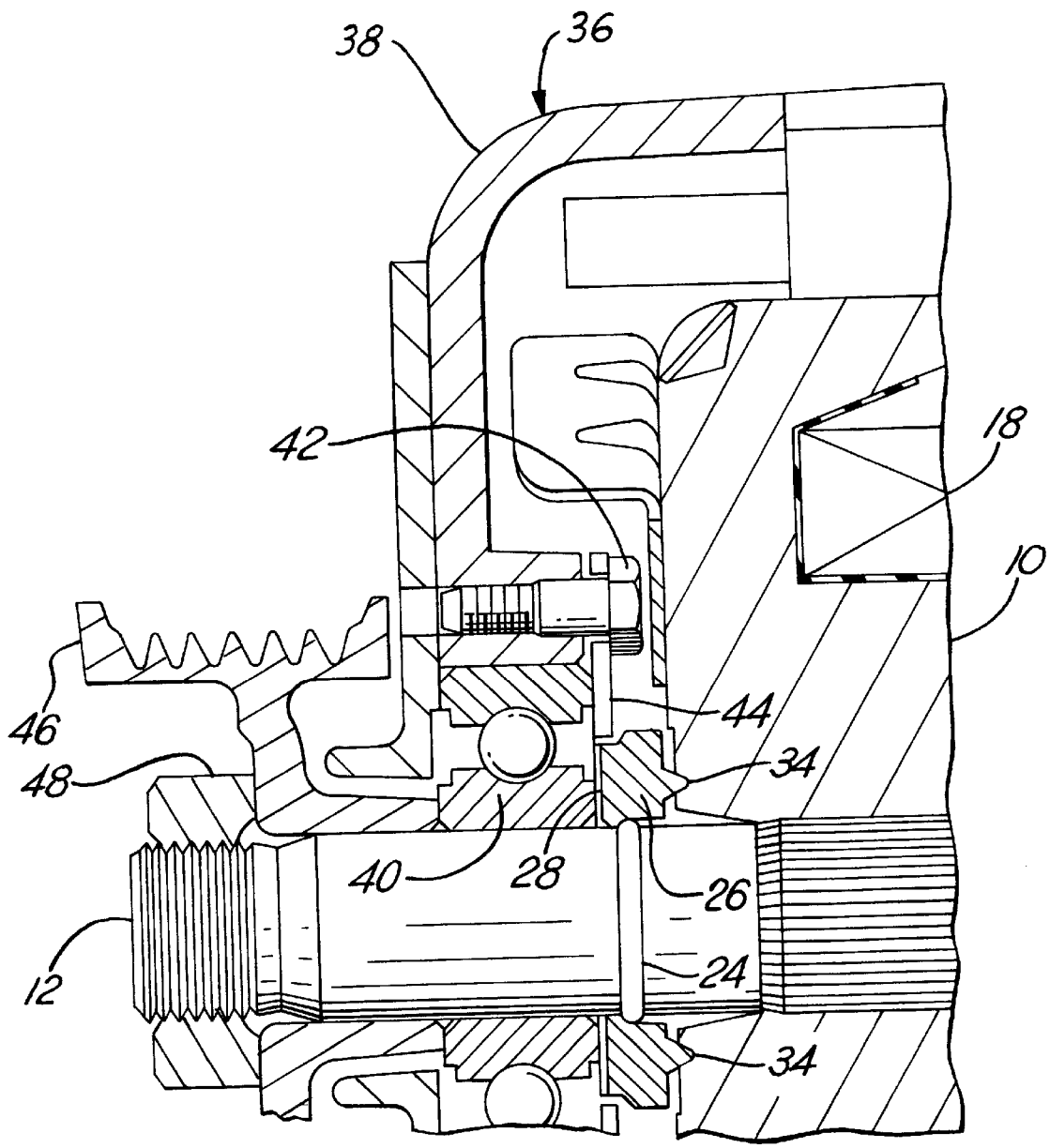
FIG. 3 is a partial cross section of an alternator 36 which contains rotor 10.

Refer now additionally to FIG. 3, which shows a cross-sectional partial side view of an alternator 36 which includes rotor 10. Alternator 36 includes a housing 38 and a bearing 40. The primary purpose of bearing 40 is to provide support for shaft 12. Affixed to housing 38 with bolts 42 is a bearing retainer 44, which holds bearing 40 in place. A pulley 46, designed to be driven by a belt from the vehicle's engine, is affixed to shaft 12 with a nut 48.

As can be seen in FIG. 3, surface 28 of rotor stop 26 contacts bearing 40. This contact positions rotor 10 axially within alternator 36.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for manufacturing a rotor for an electrical machine, said rotor having a shaft which defines an axis of rotation, said method comprising the steps of:

forming a generally annular rotor stop having a surface with at least one radially-disposed groove;

affixing said rotor stop to another component of said rotor so that said rotor stop is axially affixed with respect to said shaft, with said surface facing axially outwardly from said rotor; and machining said surface of said rotor stop.

2. A method as recited in claim 1, wherein said step of axially affixing said rotor stop is performed before said machining step.

3. A method as recited in claim 2, wherein said step of forming said rotor stop includes forming a plurality of said grooves.

4. A method as recited in claim 1, wherein said step of forming said rotor stop includes forming a plurality of said grooves.

5. A method for manufacturing an electrical machine, said electrical machine including a rotor having a shaft which defines an axis of rotation of said rotor, said method comprising the steps of:

affixing a rotor stop to another component of said rotor so that said rotor stop is axially affixed with respect to said shaft, said rotor stop having a surface facing axially outwardly from said rotor and containing at least one groove which is radially-disposed with respect to said axis of rotation;

machining said surface of said rotor stop; and assembling said rotor within said electrical machine with said surface of said rotor stop axially locating said rotor.

6. A method as recited in claim 5, wherein said step of axially affixing said rotor stop is performed before said machining step.

\* \* \* \* \*